Oct. 26, 1943.  J. DELASHAW ET AL  2,332,783
GIN SAW CLEANER
Filed April 2, 1941  2 Sheets-Sheet 2
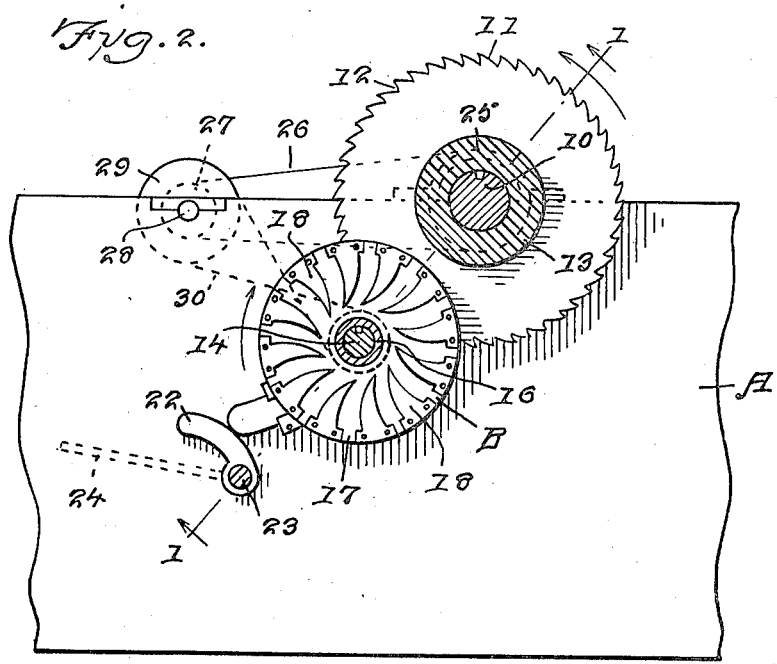
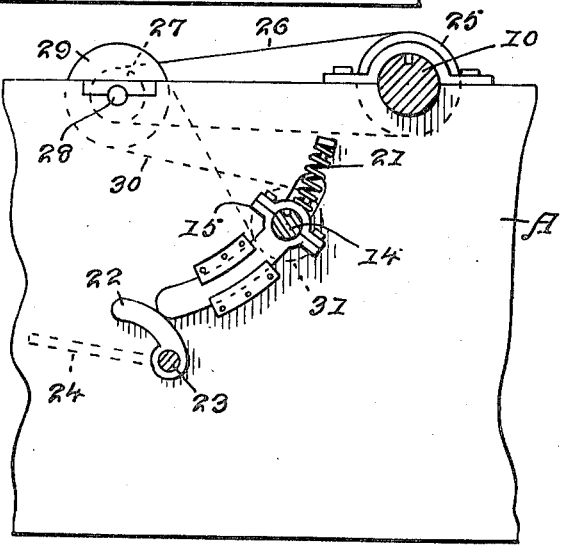
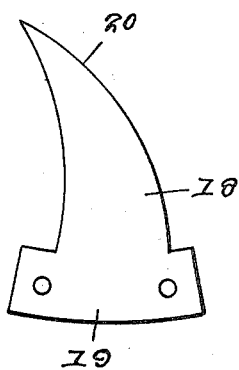

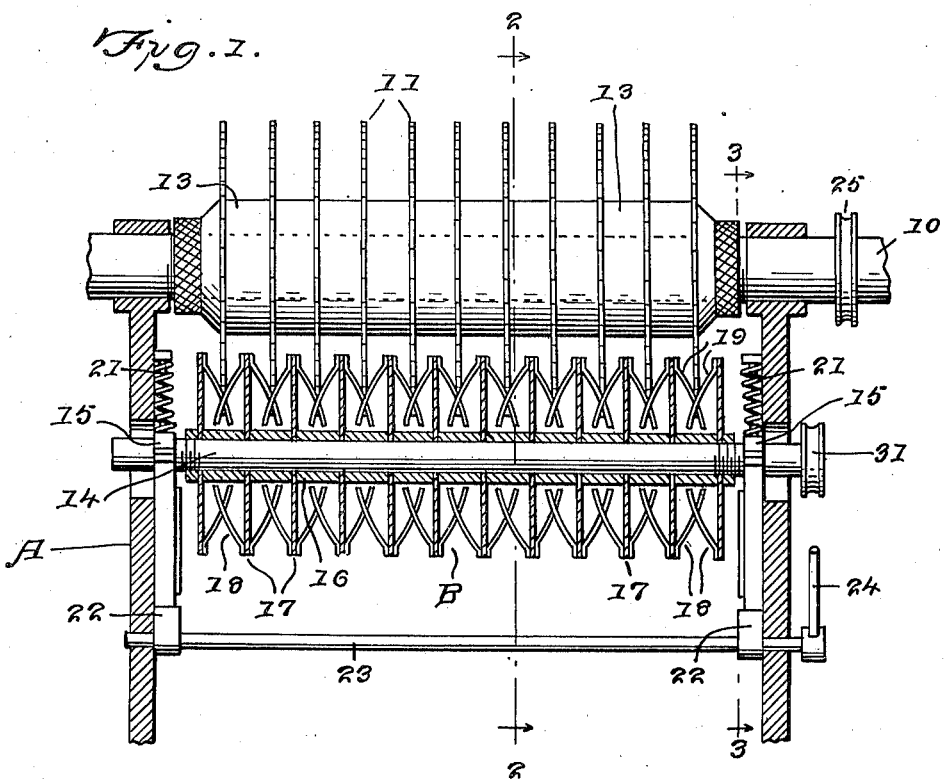
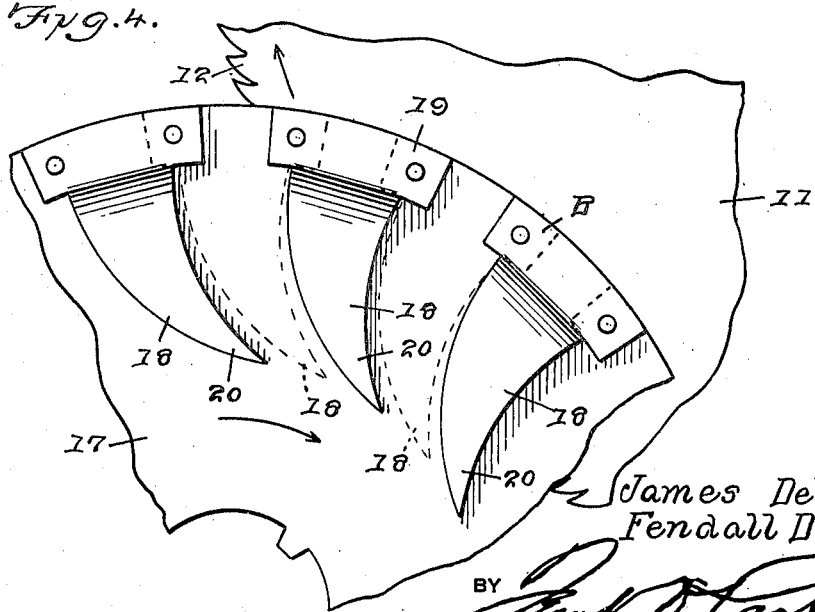

Patented Oct. 26, 1943

2,332,783

UNITED STATES PATENT OFFICE 2,332,783

GIN SAW CLEANER

James Delashaw and Fendall D. Gibson, Moulton, Ala.

Application April 2, 1941, Serial No. 386,554

3 Claims. (Cl. 19—64)

The invention relates to cotton gin cleaners and more especially to gin saw cleaners.

The primary object of the invention is the provision of a cleaner of this character, wherein a raking action takes place between the disks of the gin saw and inwardly of the teeth thereof, as well as at both sides of each disk, thereby removing all foreign matter, such as wet cotton, gummy substances and the like from the saw during the operation of the same.

Another object of the invention is the provision of a cleaner of this character, wherein its construction is novel in entirety, and in its association with the gin saw, so as to successfully clean the latter while the gin is in operation.

A further object of the invention is the provision of a cleaner of this character, wherein the blades thereof are located at the periphery of the cleaner disks and are curved with an alternate disposition directed inwardly in convergent relation to each other toward the axis of the cleaner, so that in the operation of the latter the cleaner blades extend out past the saw teeth for contact with the same on each side thereof, raking any substance out and off of the gin saw, starting from the inside or rear part thereof and scraping out toward the points of the teeth.

A still further object of the invention is the provision of a cleaner of this character, which is simple in construction, thoroughly reliable and efficient in operation, strong, durable, rotating reversely to the direction of rotation of the gin saw, enabling a continuous cleaning action concurrently with the working of the gin saw, and inexpensive to manufacture and install.

With these and other objects in view the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a fragmentary sectional view taken on the line 1—1 of Figure 2 looking in the directions of the arrows, illustrating the manner in which the cleaner constructed in accordance with the invention operates.

Figure 2 is a sectional view taken on the line 2—2 of Figure 1 looking in the direction of the arrows.

Figure 3 is a sectional view on the line 3—3 of Figure 1.

Figure 4 is a fragmentary enlarged elevation.

Figure 5 is a detail side view of one of the cleaner blades.

Similar reference characters indicate corresponding parts throughout the several views in the drawings.

Referring to the drawings in detail A designates generally a portion of a gin frame in which is journaled a shaft 10 fitted with a suitable number of disk saws 11, these being toothed at 12 throughout their peripheries. The disk saws 11 are uniformly spaced from each other by a sectional hub 13 and these with the disk saws are fixed upon the shaft 10 in any desirable manner. These parts may be of any usual or well known form.

Arranged at one side of and below the shaft 10 is a rotary cleaner B for the disk saws 11 and comprises an axle 14 which extends parallel with the said shaft 10. The axle 14 is journaled in slidable bearings 15, these being suitably mounted on the gin frame A for the movement of the said axle 14 toward and away from the gin saws 11. Upon this axle 14 is a sectional hub 16, the sections of which serve as separators for a plurality of cleaner disks 17, which are of the same thickness but of smaller diameter than the disk saws 11. The cleaner disks 17 are adapted to extend inwardly between the disk saws 11, there being one more cleaner disk than gin saws and all of such disks 17 are disposed an equal distance from opposite faces of the said saws 11 in working relation thereto. The hub and disks of the cleaner B are secured to the axle 14 in any desirable manner.

Secured to opposite faces of the cleaner disks 17 at the peripheries thereof are inherently springy cleaner blades 18, these being tapered toward the hub 16 and are curved from the heels 19 to the pointed tips 20 of the same. These blades 18 are laterally angled from the faces of the disks 17 and those adjacent to each other are staggered with respect to one another so that the tips 20 cross or overlap one another and freely pass the ends of the teeth 12 of the disk saws 11, or in other words effect a complete cross in front of the teeth 12 and maintain this confronting relationship during the operation of the gin machine.

The cleaner B rotates reversely to the direction of rotation of the gin saws 11 and the blades 18 contact the latter so that the said saws 11 will be scraped from the inside toward the outside thereof, the blades 18 being effective for covering all of the space between adjacent saws 11. When the cleaner B is not in operation there will be a distance between the saws 11 and the same. The disk saws revolve in the cleaner B.

Active against the slide bearings 15 are springs 21 which operate to urge the cleaner B away from the gin saws 11. Also countering the action of the springs 21 and operative against the bearings 15 are cams 22, these being fixed to an actuator shaft 23 suitably journaled in the frame A. The shaft 23 outside of the frame A is fitted with an operating lever 24 manually controlled. By adjusting the cams 22 the cleaner B can be moved toward the gin saws 11 or through the action of the springs 21 the cleaner B will be shifted away from the said saws as will be apparent.

On the shaft 10 is a main drive pulley 25, having the belt 26 trained thereover, the latter being trained over a pulley 27 on a shaft 28 and this pulley 27 is clutch releasable from the latter. The shaft 28 carries a pulley 29 which is clutch releasable therefrom and has trained thereover the belt 30, it being also trained over a pulley 31 fixed to the axle 14. The shaft 28 is located on a line perpendicular to a line drawn through shaft 10 and shaft or axle 14 causing the belt between shaft 28 and axle 14 to be tight at all times, even though the cleaner B is thrown out of operation.

What is claimed is:

1. A cleaner device for a rotatable disk-type peripherally toothed gin saw, comprising rotatably supported disks having a common axis and arranged in spaced relation to each other for accommodating a gin saw therebetween, cleaner blades on adjacent faces of said disks at the peripheries thereof and being reversely angled to each other for converging toward one another in the direction of the axis common to said disks to cross each other for overriding the peripheral teeth of said saw and means for rotating the disks.

2. A cleaner device for a rotatable disk-type peripherally toothed gin saw, comprising rotatably supported disks having a common axis and arranged in spaced relation to each other for accommodating a gin saw therebetween, cleaner blades on faces adjacent each other of said disks next to the peripheries thereof and being reversely angled to each other for converging toward one another in the direction of the axis common to said disks to cross each other for overriding the peripheral teeth of said saw, the blades being tapered in the direction of the axis of the disks and means for rotating the disks.

3. A cleaner device for toothed rotary disk gin saws, comprising a rotatable shaft confronting said saws, spaced disks rotated in unison by said shaft, elongated longitudinally curved cleaner blades having their outer ends fixed to opposed faces adjacent to each other of said disks at the peripheries thereof with the inner ends of said blades approaching the rotatable shaft, the said blades being bent laterally with respect to the disks to inwardly converge toward each other in crossed relation to one another and override the teeth of the gin saws confronting the rotatable shaft, and means for operating the said shaft.

JAMES DELASHAW.
FENDALL D. GIBSON.